United States Patent [19]
Tsui

[11] Patent Number: 6,150,979
[45] Date of Patent: Nov. 21, 2000

[54] PASSIVE RANGING USING GLOBAL POSITIONING SYSTEM

[75] Inventor: James B. Y. Tsui, Dayton, Ohio

[73] Assignee: The United States of America as represented by the Secretary of the Air Force, Washington, D.C.

[21] Appl. No.: 09/201,554

[22] Filed: Nov. 30, 1998

[51] Int. Cl.⁷ .................................................. H04B 7/185
[52] U.S. Cl. .............................. 342/357.08; 342/357.06; 342/126
[58] Field of Search .................... 342/357.06, 357.08, 342/126; 701/213

[56] References Cited

U.S. PATENT DOCUMENTS

| | | | |
|---|---|---|---|
| 3,897,150 | 7/1975 | Bridge et al. | 356/5 |
| 4,393,382 | 7/1983 | Jones | 343/112 D |
| 4,433,334 | 2/1984 | Caputi | 343/450 |
| 5,187,485 | 2/1993 | Tsui et al. | |
| 5,912,644 | 7/1975 | Wang | 342/457 |

*Primary Examiner*—Thomas H. Tarcza
*Assistant Examiner*—Dao L. Phan
*Attorney, Agent, or Firm*—Gina S. Tollefson; Gerald B. Hollins; Thomas L. Kundert

[57] ABSTRACT

A method for determining distance from a target to an observation station using a Global Positioning System satellite as a radiation source and first and second observation station located receivers. The first receiver receives reflected position determinative satellite radio frequency signals and the second receiver receives direct position determinative satellite radio frequency signals. The time difference between satellite radio frequency signals arriving at the first and second receivers is calculated and combined with difference distance data and angular, azimuth and elevational position data and the distance from the target to observation point is determined.

6 Claims, 4 Drawing Sheets

PASSIVE RANGING USING GLOBAL POSITIONING SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a radar system which uses Global Positioning System (GPS) satellites as radiation sources and uses GPS receivers to measure the range from a target to an observation point.

Passive ranging data is critically needed information in military operations. Several decades of study on this technology provides very little new information. One conventional approach is to measure the angle of arrival of a target when the target is intentionally emitting electromagmetic energy. The angle of arrival information is measured at several positions along the flight path and a triangulation method is used to determine the range to the target. This approach requires very accurate angle of arrival measurements and a relatively long time to obtain range accuracy.

Measuring the distance between a certain target and an observation point using GPS signals is faster, convenient and more accurate than conventional approaches. The well-known Navstar GPS includes 24 spacecraft in orbits inclined at 55 degrees to the Equator. The inclined orbits provide worldwide coverage, including the North and South poles. The GPS system allows a user anywhere on Earth to receive the transmissions of at least four satellites at once. Triangulation mathematical calculations with these satellites provide a very accurate reading of position and velocity in three dimensions. Control stations around the world keep GPS satellites precisely calibrated and their orbits aligned. Each GPS satellite contains an atomic clock and transmits a continuous time signal and other information to receivers on Earth. The receiver must acquire and track these signals, decode the data, and then make range and velocity calculations.

The approach of the invention uses GPS satellites as radiation sources and GPS receivers to form a passive radar system. GPS signals have two unique characteristics which are desirable in passive range measuring. First, the signals are always available from four or more different satellites. Second, the GPS continuous time coarse/acquisition (C/A) signal has a period of 1 millisecond, thus, theoretically it is possible to measure the distance every millisecond. Because of these two characteristics, one can use GPS signals to measure distance at any location, any time and perform updates frequently. U.S. Pat. No. 5,187,485, Tsui, et al., incorporated herein by reference, discloses and claims a method to passively measure the range to a target using GPS satellites. The present invention provides an improved method for determining the distance from a target to an observation point using GPS satellites.

SUMMARY OF THE INVENTION

A method for determining distance from a target to an observation station using a Global Positioning System satellite as a radiation source and first and second observation station located receivers. The first receiver receives reflected position determinative satellite radio frequency signals and the second receiver receives direct position determinative satellite radio frequency signals. The time difference between satellite radio frequency signals arriving at the first and second receivers is calculated and combined with difference distance data and angular, azimuth and elevational position data and the distance from the target to observation point is determined.

It is therefore an object of the invention to provide a high accuracy determination of distance to a target from an observation point.

It is another object of the invention to provide a high accuracy determination of distance to a target from an observation point using GPS satellites.

These and other objects of the invention are described in the description, claims and accompanying drawings and are achieved by a method for determining distance from a target to an observation station using a Global Positioning System satellite as a radiation source, said method comprising the steps of:

pointing an observation station located first receiver directional antenna toward said target and receiving reflected position determinative satellite radio frequency signals therefrom;

positioning an observation station located second receiver toward said satellite and receiving position determinative satellite radio frequency signals therefrom;

determining a time difference between satellite radio frequency signals arriving at said first receiver and reflected satellite radio frequency signals arriving at said second receiver;

measuring angular position $\alpha$ between said satellite and said target relative to said observation station using data obtained from said pointing, positioning and calculating steps; and calculating the distance from said target to said observation station using triangulation mathematics and data obtained from said pointing, positioning and calculating steps.

DETAILED DESCRIPTION

The invention provides a radar system for determining the distance between a target and an observation point or receiver using GPS satellites as radiation sources and GPS receivers as passive information gathering units. The invention uses as few as one GPS satellite as a radiation source and two GPS receiving channels. One receiving channel uses a conventional GPS antenna to receive the signals directly and the other receiving channel uses a high gain antenna pointed at the target to receive GPS signals reflected off the target.

Figure 1:
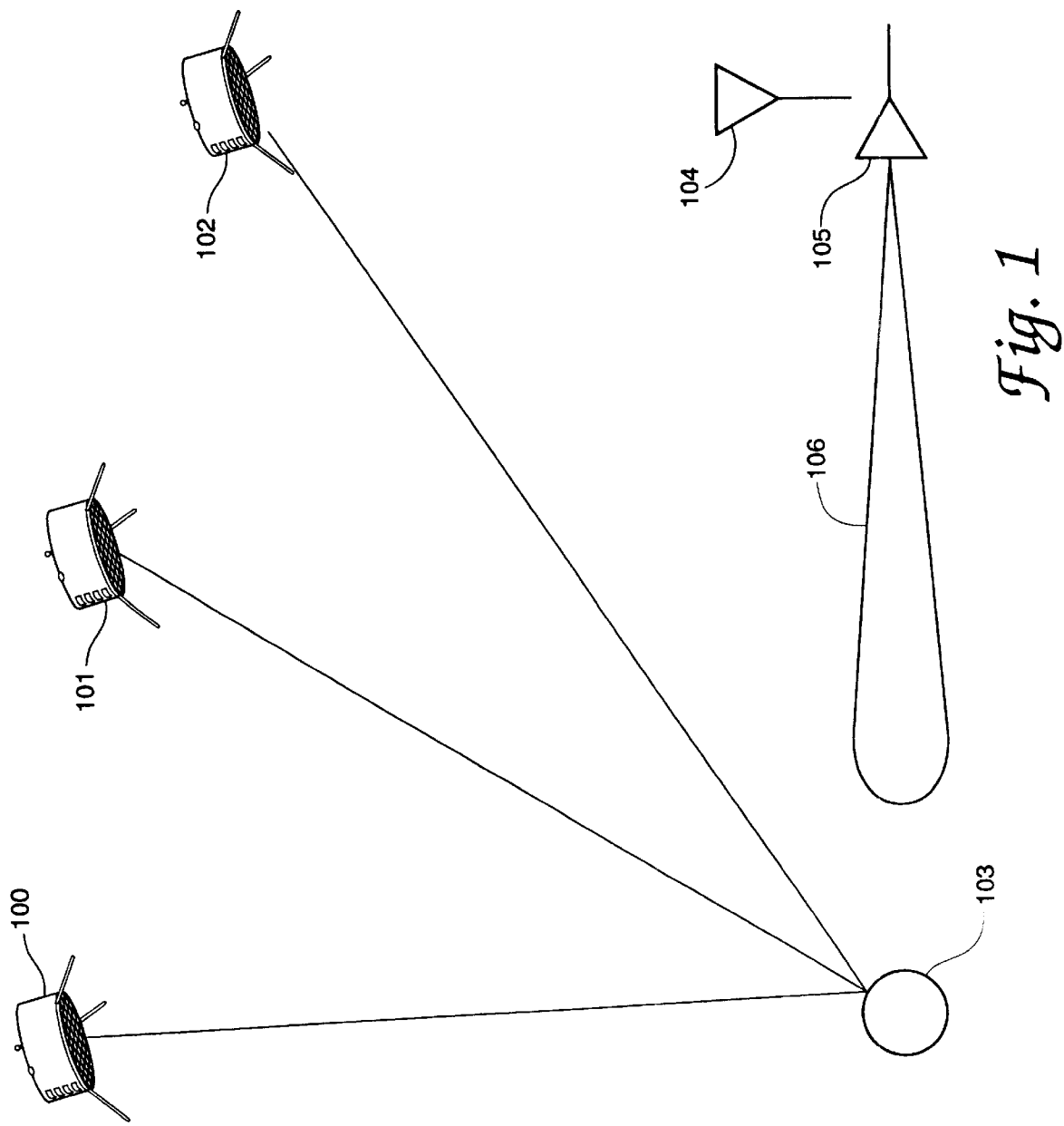
FIG. 1 shows an antenna arrangement for use in the invention.

FIG. 1 shows one possible antenna arrangement of the invention. Three GPS satellites are represented at 100, 101 and 102. The radio frequency receivers used to practice the invention are shown at 104 and 105 and a target is represented at 103. The invention may be practiced with as few as one of the satellites and will hereafter be described using one satellite. In operation, the receiver represented at 104 is used to receive signals directly from the satellite. Any commercially available conventional GPS receiver may be used for directly receiving signals from the satellite 100. Most conventional GPS receivers are capable of receiving signals from up to 11 satellites at any time, so a single receiver is operative whether one or up to 11 signals are employed to receive position data. The information obtained by receiver 104 is used to determine the position of the satellite or satellites.

The second receiver, the receiver represented at 105, is connected to a high gain antenna 106. In operation, receiver 105 receives the signal from satellite 100 as it is reflected off target 103. To practice the arrangement of FIG. 1, the high gain antenna 106 must point at the target 103. The reflected signal is weak so a high gain antenna 106 is needed at the receiver 105. Angle of arrival data, obtained using conventional methods, is used to accurately position the high gain antenna 106 toward the target 103.

Figure 2:
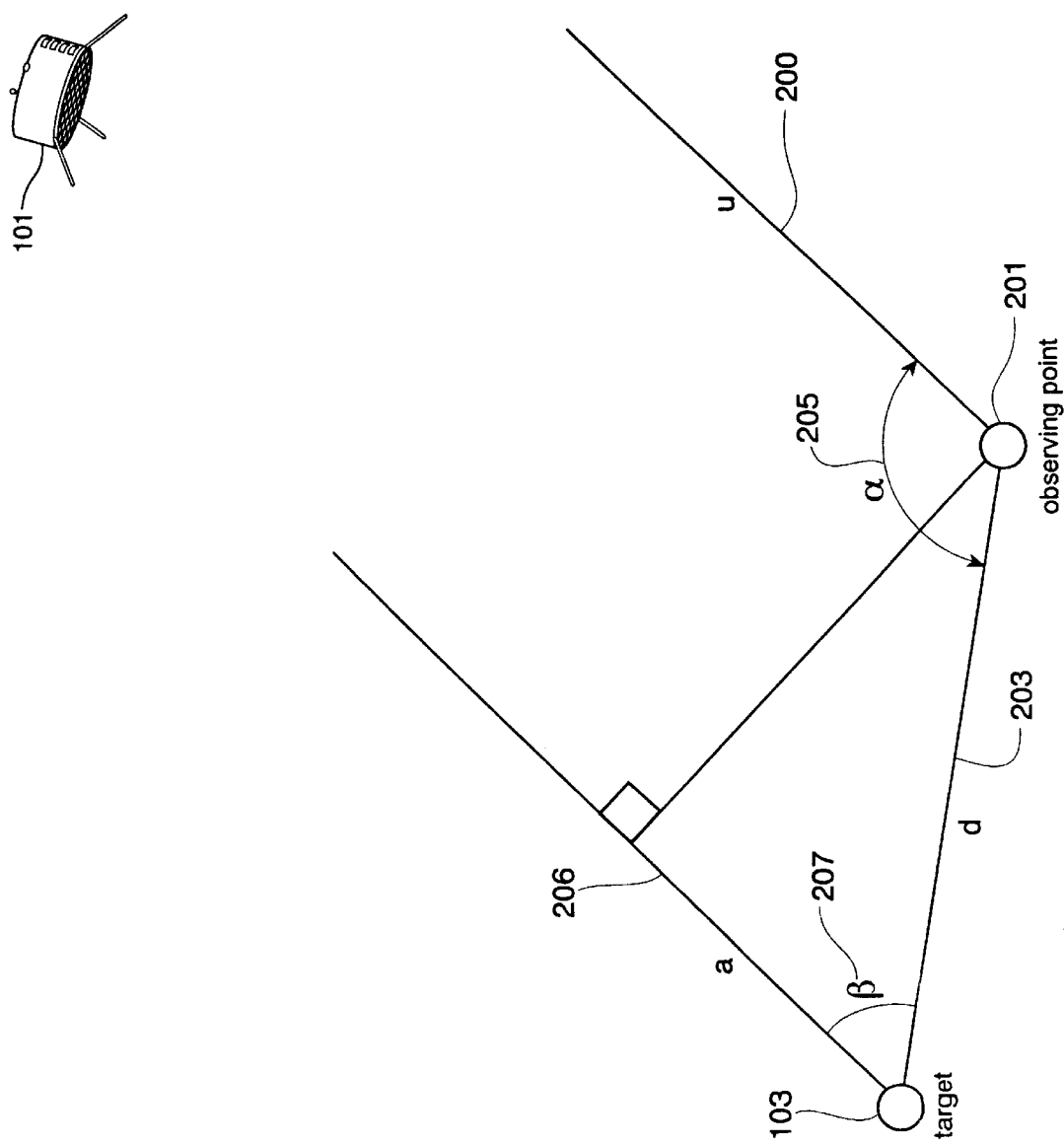
FIG. 2 shows a satellite geometry arrangement of the FIG. 1 arrangement.

The triangulation geometry between a satellite 101, the target 103 and the observation point 105 of FIG. 1 is shown in FIG. 2. In FIG. 2, the satellite 101 is far from the target 103 and the observation point 201 (receivers 104 and 105 from FIG. 1) and therefore the incident wave 206 from the satellite 101 to the target 103 and the incident wave from the satellite 101 to the observation point 201 can be considered parallel. The measured time difference between the two receivers is represented by the equation $$\frac{(a+d)}{c} \qquad \text{Eq. 1}$$

where a represents the difference distance from the satellite 101 to the target 103 and to the observation point 201, d represents the distance between the target 103 and the observation point 201 and c is the speed of light. Alternatively, d the desired value or distance from the observation point 201 to the target 103.

A measured difference distance m can be considered as $$m=a+d \qquad \text{Eq. 2}$$

where the distance d is determined from the measured quantity m. The quantity m can be measured by calculating the time difference between the signal from satellite 101 arriving at the observation point 201 and the same signal reflected off the target 103 and arriving at observation point 201. By determining measured quantity m using time distance information, the desired value of d may be determined.

In order to find the desired distance d, angle $\alpha$ must be measured. This angle can be measured from two unit vectors. The first vector u at 200 in FIG. 2 is measured from the observation point 201 in FIG. 2 to the satellite 101 and the other vector d is measured from the observation point 201 to the target 103.

Figure 3:
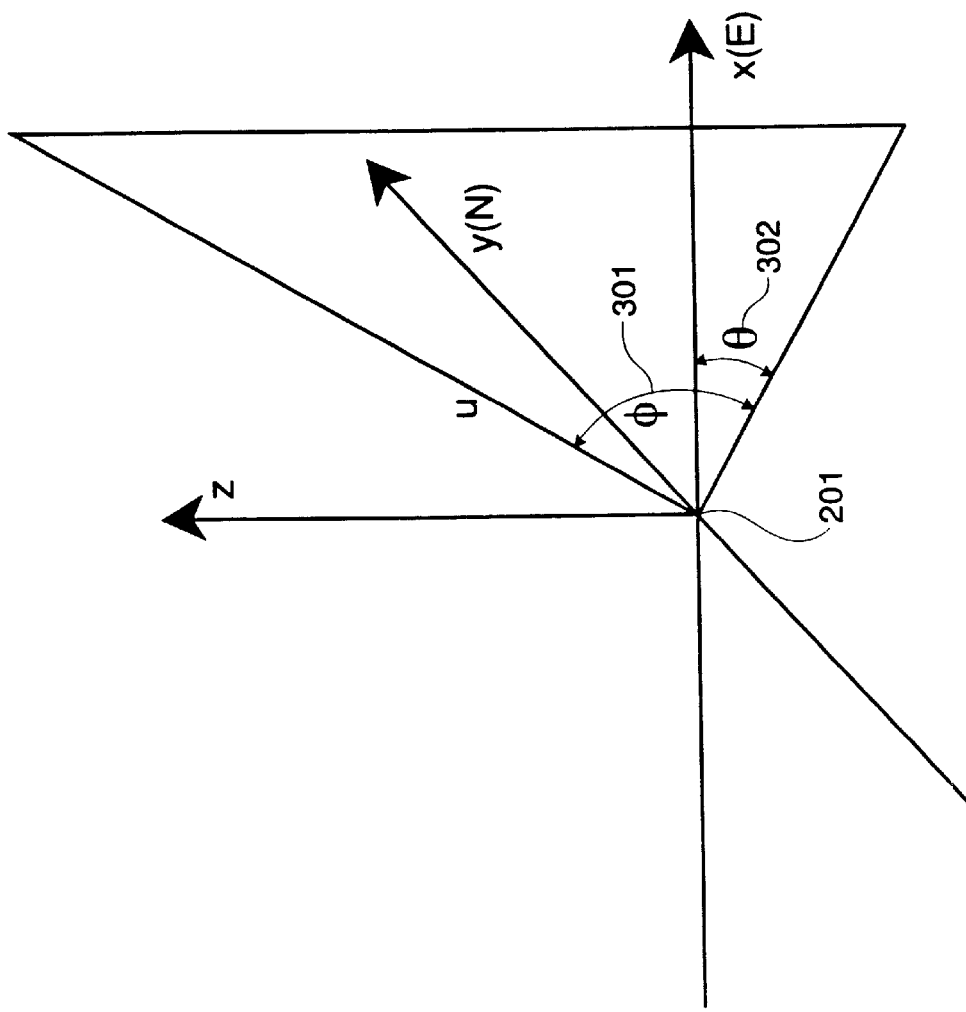
FIG. 3 shows a unit vector decomposition of the FIG. 2 satellite geometry arrangement.

FIG. 3 shows a decomposition of the satellite geometry arrangement of FIG. 2. Unit vector u from FIG. 2 is shown at 200 and the observation point from FIG. 2 is shown at 201 in FIG. 3. The angle $\alpha$ shown at 205 in FIG. 2 can be determined using the triangulation in FIG. 3 using vectors u and d and the mathematical relationship $$\cos \alpha = u \cdot d \qquad \text{Eq. 3}$$

where • represents dot product and u can be decomposed as $$u = \cos \phi \cos \theta \, \hat{x} + \cos \phi \sin \theta \hat{y} + \sin \phi \hat{z} \qquad \text{Eq. 4}$$

The angles $\phi$ and $\theta$ at 301 and 302 in FIG. 3, respectively, represent elevation angle and azimuth angle and can be determined from data measured from the receiver shown at 104 in FIG. 1.

Unit vector d can be obtained in a similar way. Once the angle $\alpha$ is obtained, angle $\beta$ shown at 207 in FIG. 2 can be calculated using the mathematical relationship $$\beta = 90 - (\alpha - 90) = 180 - \alpha \qquad \text{Eq. 5}$$

Further, the mathematical relationship between the unit vectors d and a is $$a = d \cos \beta = -d \cos \alpha \qquad \text{Eq. 6}$$

Since, from Eq. 2, m=a+d, distance d from the receiver or observation point to the target can be calculated as $$d = \frac{m}{1 - \cos\alpha} \qquad \text{Eq. 7}$$

Figure 4:
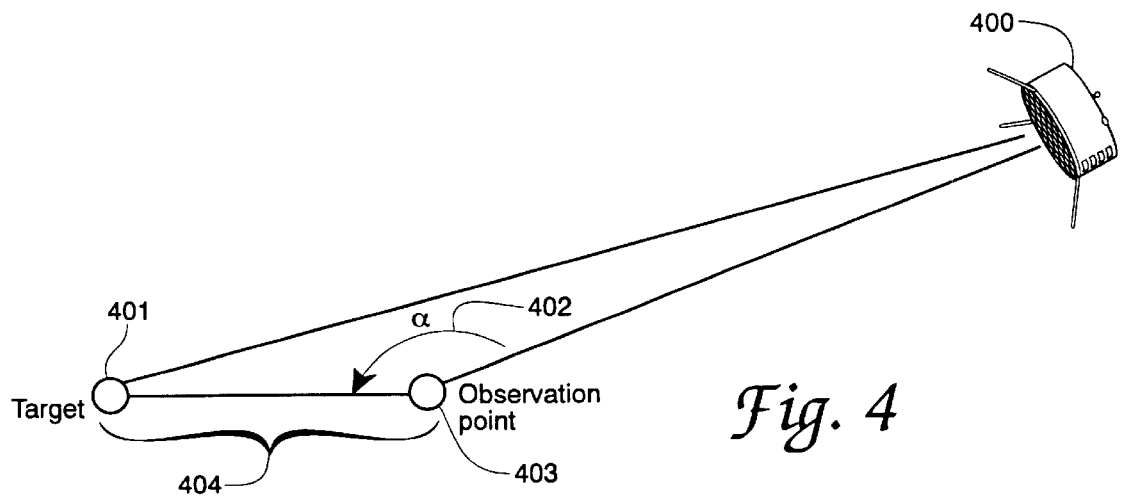
FIG. 4 shows a satellite geometry arrangement with the satellite behind the target.
Figure 5:
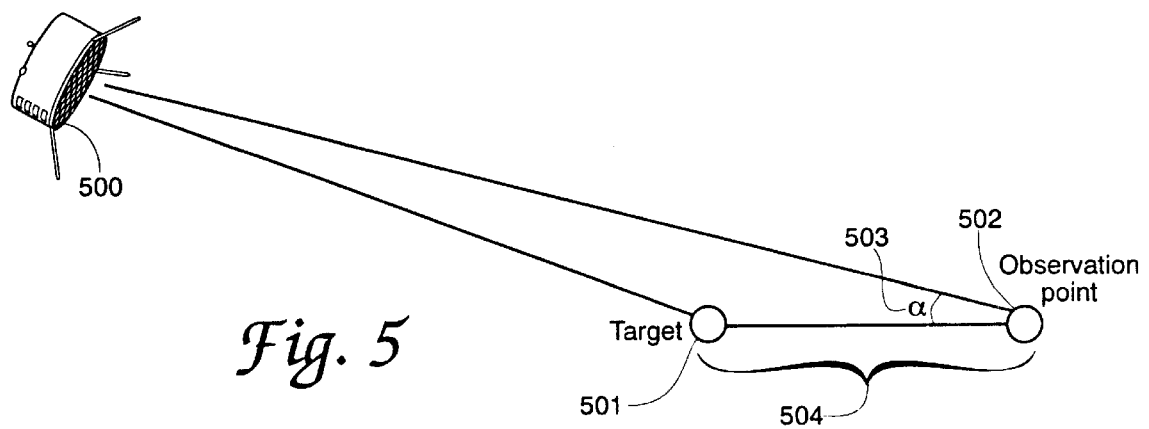
FIG. 5 shows a satellite geometry arrangement with the satellite in front of the target.

The desired distance d, shown at 404 in FIG. 4, is of a very high accuracy when the measured time difference is very large and the angle $\alpha$ is close to 180 degrees. As shown in FIG. 4, angle $\alpha$ at 402 is close to 180 degrees when the satellite 400 is behind, or in the opposite direction of the target 401. By contrast, when the angle $\alpha$ is close to 0, the calculated distance is less accurate because the satellite is almost directly in front of the target and the measured time difference is very small.

The invention thus far has been described using only one GPS satellite as the active radar source, however, more than one GPS may be used when practicing the invention. When several GPS satellites are used, several satellite signals are reflecting off a target, and the distance from the target to the observation point can be calculated from a least squares approach. Eq. 7 can be rewritten as $$m_1 = d(1 - \cos \alpha_1)$$
$$m_2 = d(1 - \cos \alpha_2)$$
$$\ldots$$
$$m_n = d(1 - \cos \alpha_n) \qquad \text{Eq. 8}$$

The least square of Eq. 8 is $$d = (\Theta^T \Theta)^{-1} \Theta^T M \qquad \text{Eq. 9}$$

where the superscript T and $-1$ represent transpose and inverse of a vector, respectively, $\Theta$ and M are $$\Theta^T = [1 - \cos \alpha_1, 1 - \cos \alpha_2, \ldots 1 - \cos \alpha_n] \qquad \text{Eq. 10}$$

$$M^T = [m_1, m_2, \ldots m_n] \qquad \text{Eq. 11}$$

With more satellite signals being used, the result obtained from Eq. 9 should be more accurate than the result obtained from Eq. 7.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

I claim:

1. A method for determining distance from a target to an observation station using a Global Positioning System satellite as a radiation source, said method comprising the steps of:

pointing an observation station located first receiver directional antenna toward said target and receiving reflected position determinative satellite radio frequency signals therefrom;

positioning an observation station located second receiver toward said satellite and receiving position determinative satellite radio frequency signals therefrom;

determining a time difference between satellite radio frequency signals arriving at said second receiver directional antenna and reflected satellite radio frequency signals arriving at said first receiver;

measuring angular position α between said satellite and said target relative to said observation station using data obtained from said pointing, positioning and determining steps; and calculating the distance from said target to said observation station using triangulation mathematics and data obtained from said pointing, positioning and calculating steps.

2. The method of claim 1 for determining distance to a target from an observation station wherein said pointing step further includes pointing an observation station located first receiver directional antenna toward said target using conventionally obtained angle of arrival data.

3. The method of claim 1 for determining distance to a target from an observation station wherein said calculating step further includes calculating the distance d using the equation $$d = \frac{m}{1-\cos\alpha}$$

where m=a+d, m being the measured difference distance between said satellite and said target and between said satellite and said observation station, and a=d cos β represents distance from said satellite to said target, β=180°−cos α, cos α=u•d, where • represents dot product and u is represented by u=cos φ cos θ x̂+cos φ sinθ ŷ+sin φ ẑ, φ and θ representing elevation and azimuth angle of said satellite relative to said observation station.

4. A method for determining distance from a target to an observation station using a plurality of Global Positioning System satellites as radiation sources, said method comprising the steps of:

pointing an observation station located first receiver directional antenna toward said target and receiving reflected position determinative satellite radio frequency signals therefrom;

positioning an observation station located second receiver toward said satellites and receiving position determinative satellite radio frequency signals therefrom;

calculating a time difference between satellite radio frequency signals arriving at said second receiver directional antenna and reflected satellite radio frequency signals arriving at said first receiver;

measuring angular position α between said satellites and said target relative to said observation station using data obtained from said pointing, positioning and calculating steps; and calculating with least square mathematics the distance from said target to said observation station using triangulation mathematics and data obtained from said pointing, positioning and calculating steps.

5. The method of claim 4 for determining distance to a target from an observation station wherein said pointing step further includes pointing an observation station located first receiver directional antenna toward said target using conventionally obtained angle of arrival data.

6. The method of claim 4 for determining distance to a target from an observation station wherein said calculating step further includes calculating the distance d using the equation $$d=(\Theta^T\Theta)^{-1}\Theta^T M^T$$

$$m_1=d(1-\cos\alpha_1)$$

$$m_2=d(1-\cos\alpha_2)$$

where $$M^T=, \ldots m_n=d(1-\cos\alpha_n)$$

m being the time difference between satellite radio frequency signals arriving at said first receiver and reflected satellite radio frequency signals arriving at said second receiver directional antenna, and $\Theta=[1-\cos\alpha_1, 1-\cos\alpha_2, \ldots 1-\cos\alpha_n]$.

* * * * *

UNITED STATES PATENT AND TRADEMARK OFFICE
CERTIFICATE OF CORRECTION

PATENT NO. : 6,150,979
DATED : November 21, 2000
INVENTOR(S) : James B.Y. Tsui

It is certified that error appears in the above-identified patent and that said Letters Patent is hereby corrected as shown below:

<u>Column 6,</u>
Line 40, "$M^T=,...m_n=d(1-\cos \alpha_n)$" should read --$M^T=[m_1, m_2, ......m_n], ...m_n =d(1-\cos\alpha_n)$--.

Signed and Sealed this

Tenth Day of July, 2001

Attest:

NICHOLAS P. GODICI
*Attesting Officer*     *Acting Director of the United States Patent and Trademark Office*